Oct. 2, 1928.
R. T. CUMMINGS
1,686,146
HEATER FOR WINDSHIELDS
Filed Jan. 31, 1927
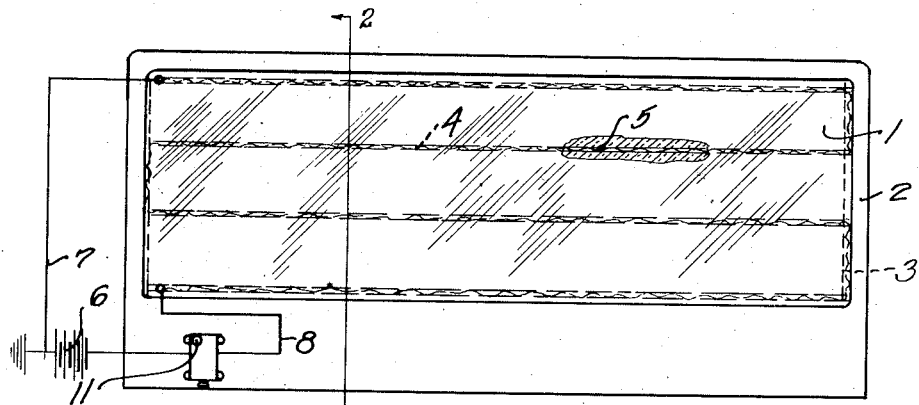
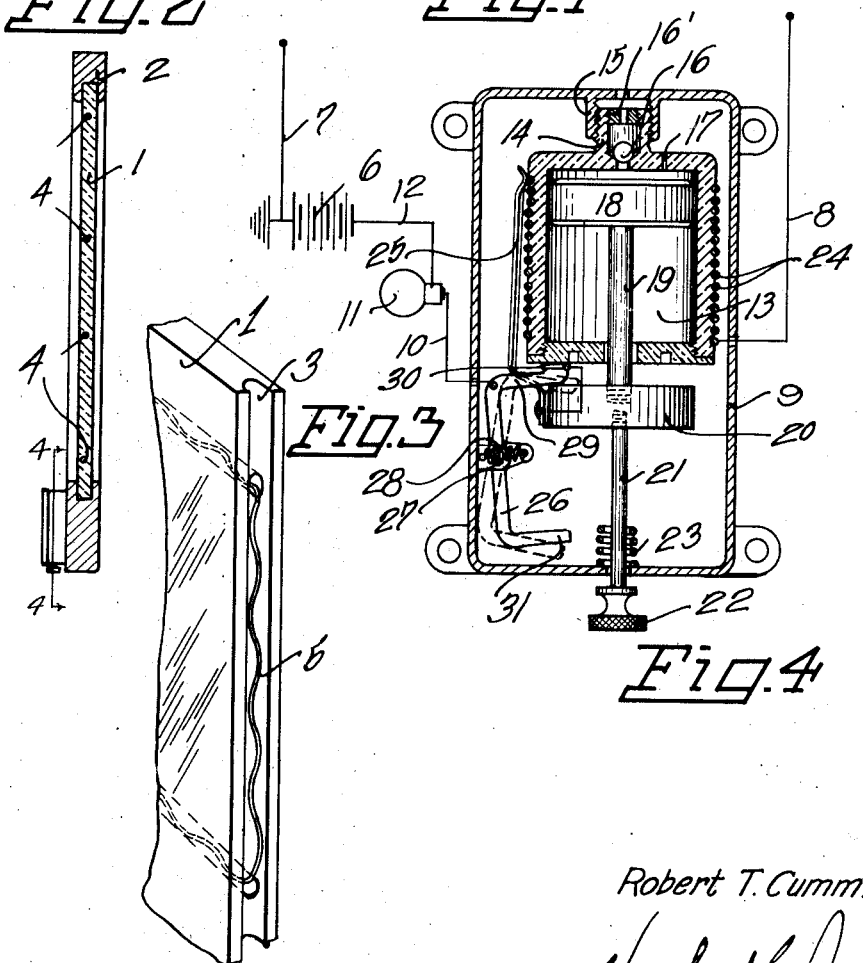
Inventor
Robert T. Cummings
By Herbert E. Smith
Attorney Patented Oct. 2, 1928.

1,686,146

UNITED STATES PATENT OFFICE.

ROBERT T. CUMMINGS, OF SPOKANE, WASHINGTON, ASSIGNOR OF ONE-HALF TO EVERETT H. PRICE, OF SPOKANE, WASHINGTON.

HEATER FOR WINDSHIELDS.

Application filed January 31, 1927. Serial No. 164,939.

My present invention relates to improvements in windshields for automotive vehicles, and the device of my invention is designed for the purpose of heating the glass of a window, windshield, or similar object, to prevent condensation thereon. When applied to the windshield of an automotive vehicle the invention is especially effective in keeping the windshield free from accumulation of snow, sleet, condensation from fogs, and the like, to insure safety in driving by preventing interference with the vision of the driver, or motorist.

The device of my invention contemplates the use of means for electrically heating the glass or material of the windshield and means are provided whereby the heating process is automatically controlled to prevent breaking of the glass which might occur if the glass were suddenly expanded due to being subjected to excessive heat. Means are also provided, preferably gravity actuated means, for governing the period of time during which the heating element is energized or active, and for automatically cutting off the energy from the electrical heater at a predetermined time.

The invention consists in certain novel combinations and arrangements of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a face view of a window sash, pane of glass, or panel of a windshield, equipped with the heating device of my invention, the electric wires being indicated in diagrammatic form.

Figure 2 is a sectional detail view at line 2—2 of Figure 1.

Figure 3 is a view in perspective at one end or edge of a glass panel as used in the physical embodiment of my invention.

Figure 4 is an enlarged view at line 4—4 showing in section the time and heat controlling means for the heating element of the invention.

The glass panel is designated as 1 and its frame as 2 and it will be understood that these parts may be used in various ways, as in a window, or as part of the windshield of an automotive vehicle. For convenience of description and illustration I have referred to the device as a windshield, from which condensation is to be eliminated by the application of heat to the glass panel of the windshield, and the operation of the heating device is controlled by the motorist or driver of a vehicle, who starts the heating device when its services are required. The operation of the heating device is automatically cut off, as will hereinafter be described.

In carrying out my invention the glass panel is grooved at its two ends as indicated at 3, and a number of longitudinally extending channels or ducts (here shown as four) are designated by the numeral 4. These ducts are arranged in position so that they will not interfere with the vision of the motorist, and they terminate at their ends in the end grooves 3 of the panel. The grooves 3, together with the end bars or the sash or frame 2 form ducts for the wires 5 that also pass through the ducts 4 of the panel. These wires form the electrical heating element, and they are preferably of waved formation, or in the shape of a stretched coil so that they may compensate for expansion and contraction and be at all times maintained in a taut condition.

An electric circuit is provided for the heating element, the source of supply being indicated by the battery 6 from which the wire 7 leads to the heating element. Another wire 8 leads from the heating element to the resistance element in the housing 9, and from the housing 9 the wire 10 leads to a pilot lamp 11, and the circuit is completed to the battery by the wire 12.

As before stated, the electrical element in the windshield is energized or made active, at the will of the motorist who, by operation of the control devices in the housing, closes a normally open electric switch for the heating current and starts the operation of the heater from a minimum resistance and consequent heat, and the intensity of the heat is gradually and automatically increased for the purpose of permitting the glass to adapt itself to the increased temperature. In this manner the glass is gradually heated to melt any condensation thereon, and gravity actuated means are used for not only determining the period of time during which the heater is operative, but also for automatically opening the switch or breaking the circuit of the heating element.

The control device within the housing comprises a cylinder as 13 having a hollow, exteriorly threaded boss 14 that is secured in the socket 15 of the housing. Within the boss is a ball valve 16 opening outwardly to permit venting of the cylinder through openings in the cylinder head, a plug 16' in the hollow boss and the top of the housing, and a vent opening 17 is also provided in the cylinder head, to permit and control atmospheric pressure in the cylinder.

A gravity actuated piston 18 is enclosed within the cylinder and its rod 19 passes through an opening in the lower head of the cylinder. On the end of the rod a weight 20 is secured, and a stem 21 is attached to the weight and extends through the lower end of the housing. A knob 22 is secured on the free end of the stem exterior of the housing, which may be used by the motorist in lifting the piston 18 to its uppermost position indicated in Figure 4 to gradually start the heating process. The piston is normally held or retained in lowered position, due to the action of gravity and the weight 20 and the latter normally rests on a coiled spring 23 within the housing and surrounding the stem 21. The piston is elevated (and the heating circuit switch is closed) by pressure of the finger or thumb on the knob 22.

The exterior of the cylinder is provided with a winding or coil of wire 24, and a conductor plate 25 attached to the weight 20 is adapted to glide or slide over the coil from top to bottom thereof for gradually increasing the intensity of the heating current, as the weight 20 falls by gravity. The conductor plate is of resilient metal and therefore maintains the required frictional and electrical contact with the coil as it moves thereover.

A predetermined time is occupied by the piston and weight in their downward movement, and at the end of the movement, the weight is instrumental in automatically breaking the heating circuit.

For this purpose an automatically operated cut out switch is used, within the housing, which includes an arm 26 pivoted at 27 and provided with an over-balancing or "snap" spring 28 that normally tends to hold the arm in adjusted position. On one end of the arm is an electric contact arm 29 forming a movable contact member to coact with the stationary contact member 30 on the bottom of the cylinder, and the other end of the arm is provided with an angular tappet arm 31, located in the path of movement of the weight 20 as it descends by gravity.

Thus, as shown in Figure 4 the switch for the heating circuit is closed and the heat will be applied to the windshield while the piston and weight are descending. When the weight contacts with the tappet arm 31 the arm 26 is moved on its pivot until the spring 28 is snapped across the pivot 27 and the arm thus moved to the dotted position. In this manner the switch is opened and the heat turned off, to be again turned on by restoring the piston and weight to uplifted or elevated position, at the will of the motorist.

Having thus fully described my invention, what I claim and desire to secure by Letters Patent is—

The combination with a heating element and a heating gravity actuated circuit having a normally open circuit breaker, of manually operated means for closing the circuit breaker, means for automatically and gradually increasing the temperature of the heating element, means for determining the period during which the circuit breaker is closed, and automatic means for opening the circuit at the end of this period.

In testimony whereof I affix my signature.

ROBERT T. CUMMINGS.